United States Patent
Lighter

(10) Patent No.: US 7,677,274 B2
(45) Date of Patent: Mar. 16, 2010

(54) PORTABLE, REMOTE, FAST-FILL INFLATOR AND NITROGEN CONVERTER UNIT

(75) Inventor: Jay Lighter, Lighthouse Point, FL (US)

(73) Assignee: Kreska Technologies, Pompono Beach, FL (US)

( * ) Notice: Subject to any disclaimer, the term of this patent is extended or adjusted under 35 U.S.C. 154(b) by 0 days.

(21) Appl. No.: 12/355,472

(22) Filed: Jan. 16, 2009

(65) Prior Publication Data

US 2009/0120531 A1   May 14, 2009

Related U.S. Application Data

(62) Division of application No. 11/447,079, filed on Jun. 6, 2006, now Pat. No. 7,624,774.

(60) Provisional application No. 60/687,326, filed on Jun. 6, 2005.

(51) Int. Cl.
  B65B 31/00  (2006.01)
  B60C 23/00  (2006.01)
  B60C 23/10  (2006.01)

(52) U.S. Cl. ............... 141/4; 141/38; 141/83; 141/95; 141/198; 340/442; 340/451; 152/415

(58) Field of Classification Search ........ 141/4–7, 141/38, 83, 94, 95, 192; 340/442, 449, 451; 152/415, 416

See application file for complete search history.

(56) References Cited

U.S. PATENT DOCUMENTS

| | | | |
|---|---|---|---|
| 3,335,766 A | | 8/1967 | Winger |
| 4,798,233 A | | 1/1989 | Mooney |
| 4,852,624 A | * | 8/1989 | Belrose ............ 152/415 |
| 4,872,492 A | * | 10/1989 | McAnally et al. ............ 141/38 |
| 4,875,509 A | * | 10/1989 | Da Silva ............ 141/38 |
| 5,307,846 A | * | 5/1994 | Heinemann ............ 141/1 |
| 5,587,698 A | * | 12/1996 | Genna ............ 340/442 |
| 5,891,277 A | | 4/1999 | Bachhuber |
| 6,155,313 A | | 12/2000 | Smalley |
| 6,170,542 B1 | | 1/2001 | Loureiro Benimeli |
| 6,286,565 B1 | * | 9/2001 | Pike ............ 141/38 |
| 6,441,732 B1 | * | 8/2002 | Laitsaari et al. ............ 340/539.1 |
| 6,470,923 B1 | | 10/2002 | Gonzaga |

(Continued)

OTHER PUBLICATIONS

Bean, John and En Hoffman, "Vaco Nieuws" Special Autopromotec, Jun. 2001, No. 01/6, p. 45 and 49.

(Continued)

*Primary Examiner*—Timothy L Maust
(74) *Attorney, Agent, or Firm*—Duane Morris, LLP

(57) ABSTRACT

A portable device for delivering nitrogen to multiple tires includes a gas source and supply line connected to a controller. The device also includes a gas delivery line comprising a manifold with a plurality of outlets in fluid communication with each other. A gas delivery line is operably connected to the controller and a plurality of extension lines with engagement chucks are operably connected to the outlets. The controller controls the supply of gas to the gas delivery line and controls a relief valve for venting the gas delivery line. The device also includes a sensor and a processor connected the controller and sensor which accepts user inputs. The controller, manifold and processor are affixed to a stand.

10 Claims, 4 Drawing Sheets

U.S. PATENT DOCUMENTS 6,612,346 B1 9/2003 Allen
6,648,027 B1 11/2003 Didur
7,053,761 B2 * 5/2006 Schofield et al. ............ 340/447
7,137,417 B2 11/2006 Kroll
7,218,209 B2 * 5/2007 Utter et al. .................. 340/442
7,258,140 B2 8/2007 Acree

OTHER PUBLICATIONS

Vakbad voord de Bander-en Wielenbrache,"Vaco Nieuws", Special Equipment, Oct. 2002, No. 8/02, p. 39.
"Vaco Nieuws", Inclusief Special, Oct. 2001, No. 01/8, p. 13.

* cited by examiner

PORTABLE, REMOTE, FAST-FILL INFLATOR AND NITROGEN CONVERTER UNIT

RELATED APPLICATIONS

The present application is co-pending with and is a divisional application of the non-provisional application entitled, "Portable, Remote, Fast-Fill Inflator and Nitrogen Converter Unit," application Ser. No. 11/447,079, filed on Jun. 6, 2006, now U.S. Pat. No. 7,624,774, which claims priority benefit of provisional application Ser. No. 60/687,326 entitled "Portable, Remote, Fast-Fill Inflator and Nitrogen Converter Unit," filed Jun. 6, 2005, the entirety of each are incorporated herein by reference.

BACKGROUND

Pneumatic tires for automobiles, aircraft and other vehicles have traditionally been inflated by compressed ambient air. Generally, compressed air works well with bicycle tires, tractor tires and even standard automobile tires run at relatively low speeds where exacting tire balance and consistent tire pressure is not critical. In the case of uses such as race cars, dragsters, and high altitude aircraft, compressed ambient air is not a satisfactory medium for inflating tires for a variety of reasons.

When compressed air is introduced into a tire via a compressor open to the ambient atmosphere, water vapor and other impurities are introduced into the tire in the same proportions as they occur in the ambient air. With all of the moisture and other impurities present, air volume in the tire fluctuates fairly widely with temperature, particularly due to the moisture changing from liquid to vapor form and from vapor to liquid form as temperatures in the tire change. In addition, tire pressures may vary from tire to tire which may also possess deleterious results.

Pressure of air in tires inflated with compressed ambient air will change about 1 psi for every 10 degree Fahrenheit change in temperature. Thus, a tire inflated at 60 degrees Fahrenheit will be substantially under inflated at 20 degrees due to the combined effects of temperature in reducing gas pressure and moisture condensing out of the air within the tire. Conversely, as temperatures increase to 90 degrees Fahrenheit, the tire will be substantially over inflated due to the water being vaporized and the attendant increase in air pressure due to temperature. These under or over inflation conditions can adversely affect rolling friction of tires on pavement, thus decreasing gas mileage. Tire wear is also substantially increased when tires are not inflated to a manufacturer's recommendations. Handling problems may be aggravated by tire pressure differential between front and back tires and/or side to side.

Water vapor within tires may also induce rust within steel belted radials, which further reduces tire life. Furthermore water vapor introduced into a tire in a high altitude jet airplane, for example, will condense and then freeze thereby forming ice crystals which generally fall to the bottom of the tire as it lies stationary in the wheel well of the airplane. When an airplane lands, the tires must accelerate virtually instantly from rest to more that 150 miles per hour. As a result, ice crystals in the tire can create a substantial imbalance. As the tire accelerates, the ice crystals are thrown around the rolling tire by centrifugal force, leading to further imbalance, increased internal wear, and an increased likelihood of tire blow-outs. In the case of race cars and dragsters, since the water vapor introduced into the tire condenses and vaporizes at unpredictable times, condensed water within the tire lags behind the column of air within the tire as the tire is rapidly accelerated. Furthermore, as the race car tires spin at high speed, considerable heat builds up in the tires themselves, thus considerably increasing the internal tire pressure due to the expansion of the water vapor.

In order to eliminate these problems, operators and owners of race cars, space shuttle transport vehicles, earthmoving and mining equipment and commercial and military high altitude aircraft often inflate their tires with compressed nitrogen or another generally non-reactive and non-combustible gas such as argon or sulfur hexafluoride. Nitrogen is an ideal gas for such a purpose since it is chemically non-reactive, non-combustible, non-flammable and non-corrosive. Furthermore, when dry, nitrogen gas is relatively stable in volume through a wide range of temperatures. For example, the specific volume of a quantity of dry nitrogen gas at 1 atmosphere of pressure varies less than 13% in a range of −10 degrees F. to +116 degrees F. Thus, the use of nitrogen to inflate a pneumatic tire offers a large reduction in fluctuations of internal tire pressure due to temperature variations over those which occur when moisture laden compressed ambient air is used. Furthermore, since nitrogen is stored in pressurized tanks under controlled conditions, the nitrogen gas can be dried and purified as it is placed into the tank, thus minimizing moisture and other impurities transferred into the tire.

However, when new or repaired tires are first placed on a wheel, they must be inflated under high pressure to get the tire bead to seat on the wheel rim. In order to accomplish this compressed ambient air must be used. Once the tire is inflated and properly seated on the wheel rim, the compressed air is bled off via a tire's Schrader spring loaded valve, and a source of compressed nitrogen is then attached to the tire valve to re-inflate the tire. With this method, the tire's internal pressure is simply returned to ambient pressure before being filled with nitrogen. This air at ambient pressure in the tire having a quantity equal to the internal volume of the tire. Along with the quantity of air left in the tire, moisture and other gaseous impurities are present in the tire in the same proportion as they are found in the ambient atmosphere. When the dry, purified nitrogen is introduced into the tire under pressure, it mixes with the air, moisture and other impurities already present in the tire as the tire is inflated. The inflated tire is thus filled with a quantity of air including attendant moisture and other impurities and a larger quantity of nitrogen, thus repeating, albeit at a reduced level, the problems associated with the use of ambient compressed air.

It is clear that a need exists for a tire inflation apparatus and method which avoids these problems of the prior art. Such a tire inflation apparatus should preferably inflate tires with compressed, purified and dried gas, such as nitrogen, to a manufacturer's recommended tire pressure while minimizing or eliminating moisture and other impurities in the tire.

In order to obviate the deficiencies in the prior art, it is an object of the present subject matter to present a novel portable gas delivery device. The device includes a gas source and supply line connected to a controller. The device also includes a gas delivery line comprising a manifold with a plurality of outlets in fluid communication with each other. A gas delivery line is operably connected to the controller and a plurality of extension lines with engagement chucks are operably connected to the outlets. the controller controls the supply of gas to the gas delivery line and controls a relief valve for venting the gas delivery line. The device also includes a sensor and a processor connected the controller and sensor which accepts user inputs. The controller, manifold and processor are affixed to a stand.

It is also an object of the present subject matter to present a novel method of ensuring pressure equalization between multiple tires during evacuation and inflation of the tires. The method includes providing a plurality of supply hoses in fluid communication with each other, attaching each of the supply hoses to a corresponding valve stem located on the tires, and supplying pressurized gas from a gas source to the tires via the supply hoses. The method further includes monitoring and controlling a gas characteristic of the pressurized gas in the of the supply hoses to inflate the tire to a predetermined pressure so as to ensure pressure equalization between each of the tires.

It is a further object of the present subject matter to present a novel method for evacuating and inflating a pneumatic tire. The method including opening a relief valve on a gas supply hose to vent the supply hose to atmosphere, closing the relief valve, and supplying pressurized inert gas from a gas source to the tire through the gas supply hose to inflate the tire with a first predetermined amount of inert gas. The method also includes opening the relief valve to vent the gas supply hose to atmosphere, closing the relief valve, and supplying pressurized inert gas from the gas source to the tire through the gas supply hose to inflate the tire with a second predetermined amount of inert gas.

These objects and other advantages of the disclosed subject matter will be readily apparent to one skilled in the art to which the disclosure pertains from a perusal or the claims, the appended drawings, and the following detailed description of the preferred embodiments.

DETAILED DESCRIPTION

Figure 1A:
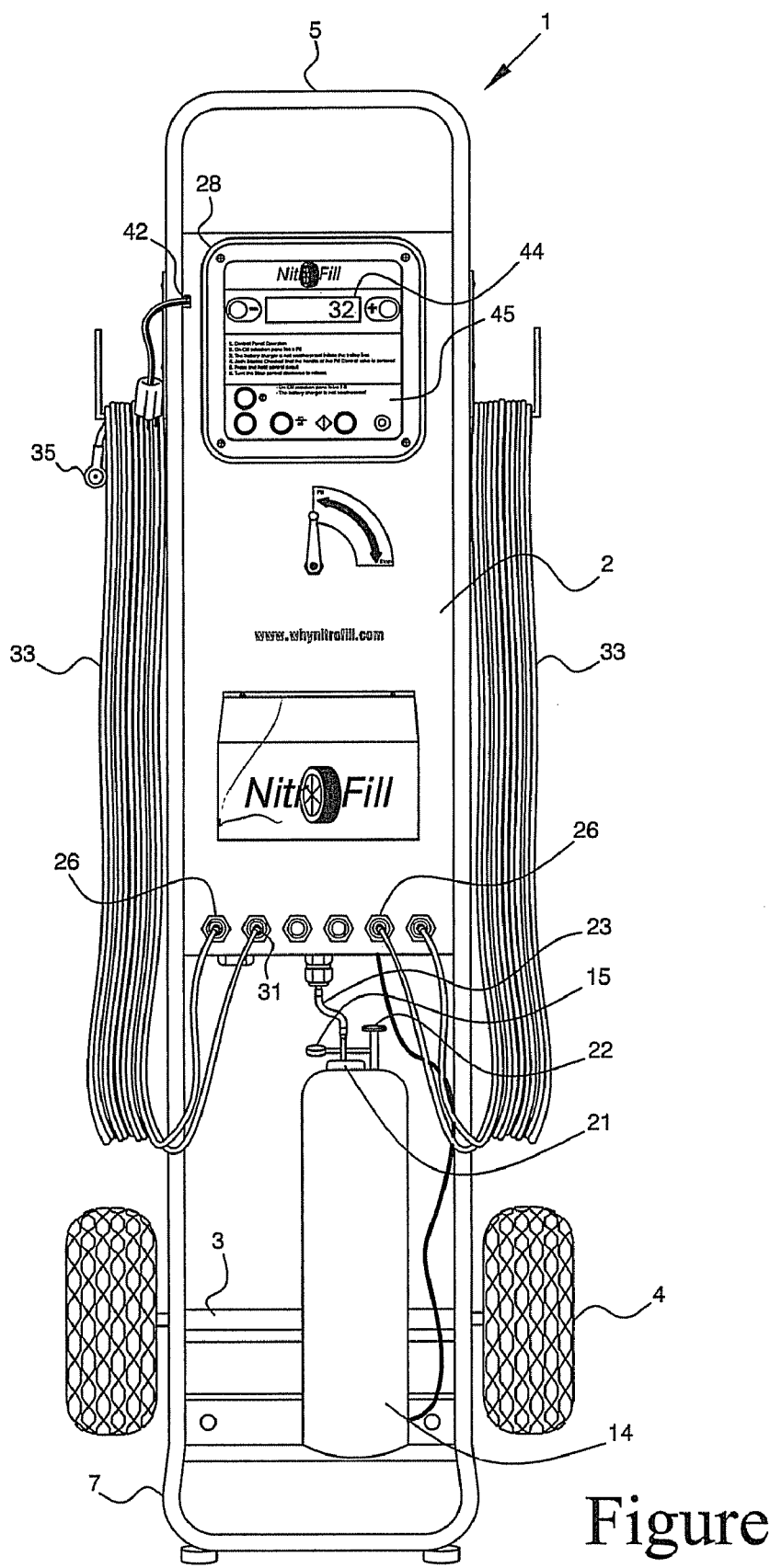
FIGS. 1A and 1B are representations of a portable gas delivery device according to an embodiment of the present subject matter.
Figure 1B:
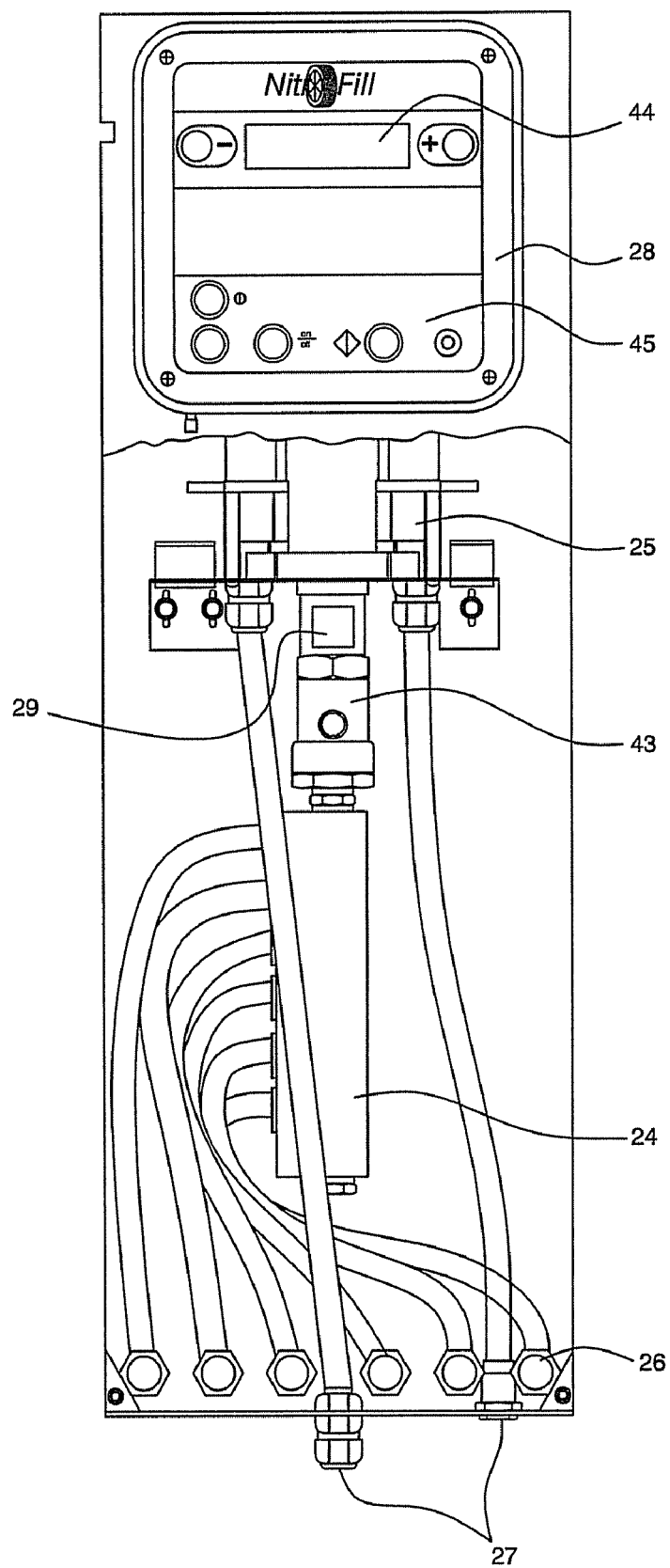

Referring to the drawings, and particularly FIGS. 1A and 1B, a tire evacuation and inflation apparatus is illustrated. The tire evacuation and inflation apparatus 1 includes a frame 2 mounted on an axle 3 with a pair of wheels 4 attached thereto. The frame 2 includes a handle 5 on the rear thereof which allows the frame 2 to be easily tilted backward such that the weight of the apparatus 1 is resting on the wheels 4. A brace 7 is attached to the bottom of the frame 2 and extends across the width thereof to provide stable support for the frame 2. A tank 14 containing a quantity of pressurized, dried and purified gas, such as nitrogen, sulfur hexafluoride or argon is also positioned within the frame 2. A pressure regulator 15 is attached to an outlet 21 of the tank 14 which outlet is opened and closed via a hand operated valve 22. A nitrogen supply hose 23 is connected between the regulator 15 and an outlet manifold 24. A first end of each of a plurality tire supply hoses or extension lines 33 is attached to an outlet 26 of the outlet manifold 24 with a second end being attached to a standard spring closed tire valve chuck 35. The extension lines 33 are preferably pre-coiled lines and connect to the outlets with quick disconnect fittings 31. Additionally, the frame 2 may have a plurality of engagement chuck retainers (not shown) that secure the engagement chucks 35 during storage. The engagement chuck retainers are preferably positioned on the upper portion of the frame 2 or stand.

The manifold 24 may also include a connection 27 adapted to receive a gas supply line from a remote gas supply in lieu of the gas supply tank 14. The plurality of outlets 26 may be each in fluid communication with one another. A controller 25 is controls the supply of gas from the gas supply line 23 to the manifold 24 and further controls a relief valve 43 that vents the gas of the delivery lines 33 and manifold 24. The controller 25 is preferably an electromechanical valve.

A sensor 29 is located downstream of the controller 25 and is operably connected to a processor 28 which operates to control the controller 25 and relief valve 43. The sensor can be any type of appropriate transducer such as strain or piezoelectric gages for pressure, or thermocouples for temperature. The processor 28 can be any one or more of a microprocessor, application specific integrated circuit, or logical circuit. The processor 28 controls the controller 25 based on gas characteristics detected by the sensor 29 and/or a predetermined duty cycle stored in a memory of the processor 28. The gas characteristics may include, but are not limited to, gas flow rate, gas pressure, gas temperature, gas volume or specific gas concentration. The processor 28 may also include an internal timer for implementing the predetermined duty cycle. The predetermined duty cycle includes at least one inflation stage, a deflation stage, and a second re-inflation stage. Depending upon the desired concentration of nitrogen in the tires, the predetermined duty cycle may include several successive inflation-deflation cycles. For every inflation-deflation cycle the concentration of nitrogen or other inert gas would increase.

To operate the processor 28 and controller 25, an electrical power interface 42 is located on the frame 2. The electrical power interface can be a connection to battery terminals of a battery (not shown) that attaches to the frame 2 or an AC plug on the end of an extension cord as shown in FIG. 1. The processor 28 may also include an input device 45 to receive user input as well as a display 44 to assist with the entry of user inputs. The input device 45 may be a keyboard, touch screen or other similar device.

A tire (not shown) to be inflated originally, is first seated on a wheel rim by being inflated with compressed ambient air in a well known manner. Depending upon the type of tire, the tire is either seated on the wheel by pressure on a peripheral "bead" which engages a groove in the wheel or, in the case of some racing and high performance applications, the tire may actually be bolted to the wheel rim to prevent slippage. In either case, the inflated, seated tire is then deflated as described in a method discussed hereafter or in a standard method, by removing the Schrader valve from the tire valve stem, or holding the Schrader valve open with some type of tool. Once deflated, the tire remains filled with a quantity of ambient air at atmospheric pressure. The Schrader valve, if removed, is then replaced. The tire evacuation and inflation apparatus 1, if not already attached, may then be attached to the tire valve stem by connecting the chuck 35 to the tire valve stem.

Nitrogen (or another suitable pressurized gas) is then supplied to the tire via the nitrogen supply hose 23, the controller 25, the manifold 24 and the tire supply hose 33. The controller 25 is preferably set by the processor to supply nitrogen to pressurize the tire to the desired internal tire pressure, such as 32 psi for a standard passenger tire or 6 to 7 psi for large bias ply rear tires used on dragsters. The controller 25 may be initially set at a pressure considerably higher than the desired internal tire pressure to ensure that the tire will inflate relatively rapidly to the desired pressure.

The pressure of the gas within the tire will change with changes in temperature of the gas. If the tire is filled to a recommended pressure with cooled nitrogen (or other gas utilized), the tire pressure will subsequently increase as the temperature of the nitrogen rises to ambient temperature and will further increase during operation of the vehicle resulting in over-inflation of the tire.

In a preferred embodiment, the temperature, as well as the pressure, is monitored and controlled to fill the tire to a predetermined pressure at a predetermined temperature to thereby minimize problems associated with over and under inflation of the tires due to changes in the tire pressure as the temperature of the gas in the tires changes during use. Of course, other gas characteristics may be monitored and controlled such as gas concentration, flow rate, volume and other known gas characteristics.

The tire is thus inflated by the nitrogen tank 14 and regulator 15 to a preferred tire pressure at a preferred temperature, thus yielding a tire which is inflated solely with a purified, dried gas. The tire, thus inflated, will not be subject to the wide swings in tire pressure with temperature exhibited by tires inflated by traditional methods.

Figures 2, 3:
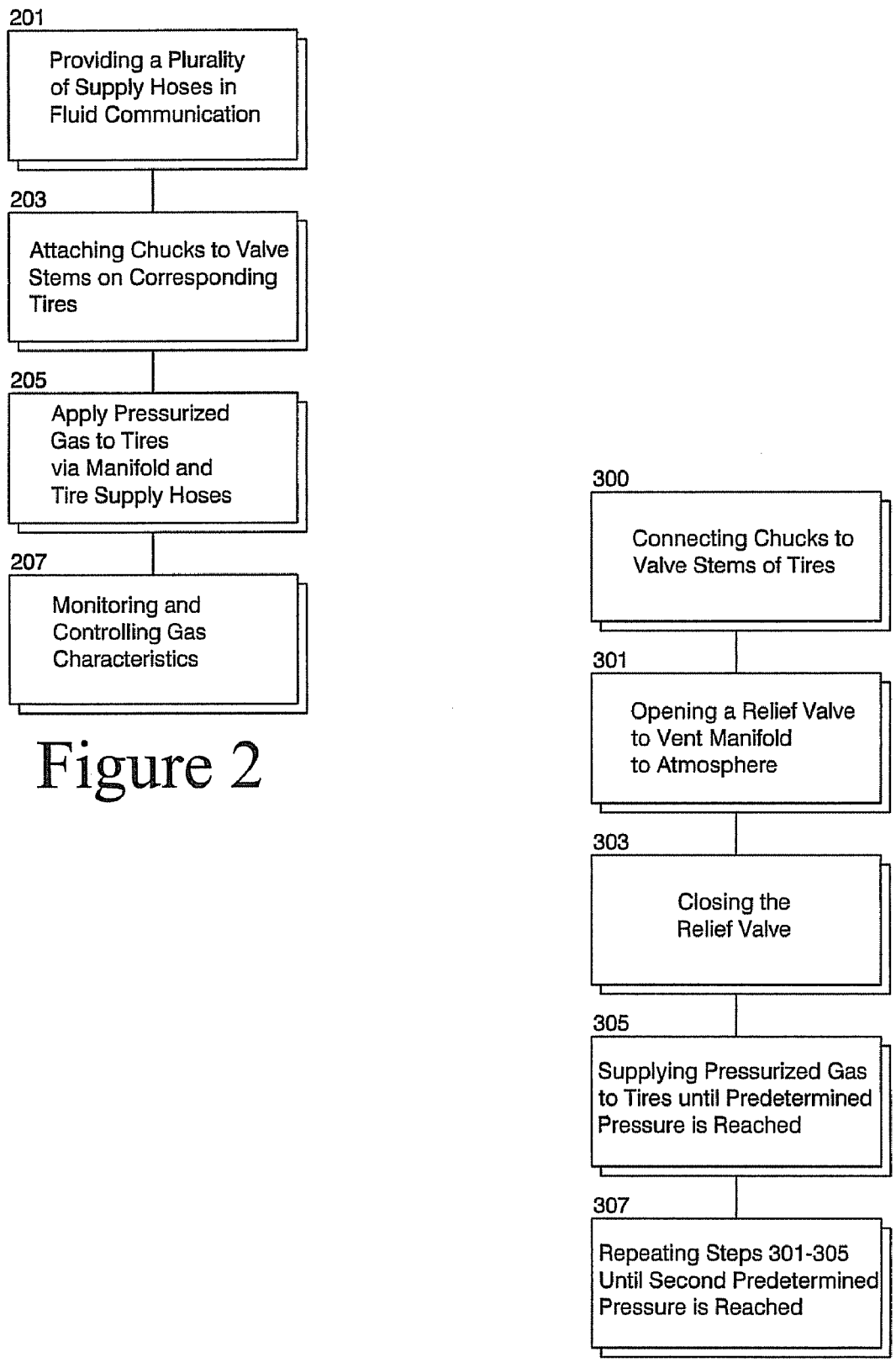
FIG. 2 is a flow chart representation of a method of ensuring pressure equalization between multiple tires according to an embodiment of the present subject matter.
FIG. 3 is a flow chart representation of a method of evacuation and inflating a pneumatic tire according to an embodiment of the present subject matter.

FIG. 2 is a flow chart representation of a method to ensure pressure equalization between a plurality of tires during evacuation and inflation of the tires. A plurality of supply hoses in fluid communication with each other is provided and each of the supply hoses is attached to a corresponding valve stem on the plurality of tires as represented in Block 201 and 203 respectively. In a passenger car, four tire supply hoses can be supplied and all four tires simultaneously filled with nitrogen. In vehicles where the tire sets, e.g., front and back tire sets, require different pressures, each set may be filled individually, i.e., filing the front set and then filling the back set in a passenger car.

Pressurized gas from a gas source, such as the portable tank or from a supply line, is then applied to the plurality of tires via the manifold 24 and tire supply hoses 33 as represented in Block 205. The processor 28, via sensor 29 and controller 25, monitors and controls a gas characteristic of the pressurized gas, such as temperature, pressure, concentration or volume as represented in Block 207. The result is inflation of the plurality of tires to a predetermined pressure where equalization of pressure exists between each of the plurality of tires due to their communication with the manifold 24.

In a preferred embodiment, a user inputs data, such as the number of tires and the identity, e.g., type, size or model of the tire, or simple desired pressure into a processor. The processor may then retrieve tire data, if not provided by the user, from an internal or external database as a function of the identity of the tire. The processor also advantageously determines the appropriate predetermined pressure. For example, the user inputs a tire size such as 235 R15, the processor and then retrieves data, such as the recommended pressure or tire volume. The processor, by monitoring a gas characteristic such as pressure, can then apply pressurized gas until the predetermine pressure is reached, or in an alternative embodiment may determine a pressure at the monitored gas temperature which would result in the recommended pressure upon the gas in the tire reaching ambient temperature. In either manner, since all of the tires are in fluid communication with each other through the manifold and extension lines, all the tires would have identical pressure, which, as described previously, is beneficial to performance.

FIG. 3 is a flow chart for a method of evacuating and inflating a pneumatic tire. This method is applicable to tires currently filled with air and making a transition to nitrogen. The extension lines 33 via the chuck 35 are connected to the valve stems of the tires to be switched to nitrogen as represented in Block 300. A relief valve 43 in fluid communication with the manifold 24 is then opened to vent the tire supply hose 33 to atmosphere as represented in Block 301. This venting allows the majority of air in the tires to be evacuated from the tires. The relief valve is then closed when the pressure in the tires reach atmospheric pressure as represented in Block 303. Pressurized nitrogen or other inert gas is then supplied from a gas source to the tire through the gas supply hose as represented in Block 305. The nitrogen is supplied to inflate the tires until a first predetermined amount of nitrogen is supplied to the tires or until a predetermined pressure is reached. This cycle is then repeated opening the relief valve to vent the gas supply hose to atmosphere, closing the relief valve, and supplying pressurized inert gas from the gas source to the tire through the manifold 24 and tire supply hose 33 to inflate the tire with a second predetermined amount of nitrogen or second predetermined pressure as represented in Block 307. The second predetermined amount of nitrogen and the second predetermined pressure need not be different from the first predetermined amount and pressure. This cycle can be repeated several times as part of a duty cycle or until a threshold is reached.

Table 1 illustrates the gas characteristics in the tire using the method of FIG. 3. These gas characteristics are also shown graphically in FIG. 4. For ease of illustration, air is approximated as 80 percent nitrogen and 20 percent oxygen.

TABLE 1

| Steps | Gage Pressure (psi) | Volume (standard atmosphere) | Nitrogen/oxygen Concentration (%) |
| --- | --- | --- | --- |
| 1. Opening the relief valve | 35 | 10 | 80/20 |
| 2. Closing the relief valve | 0 | 1 | 80/20 |
| 3. Supplying Gas | 0 | 1 | 80/20 |
| 4. Opening the relief valve | 35 | 10 | 98/02 |
| 5. Closing relief valve | 0 | 1 | 98/02 |
| 6. Supplying Gas | 0 | 1 | 98/02 |
| Final | 35 | 10 | 99.8/0.2 |

Figure 4:
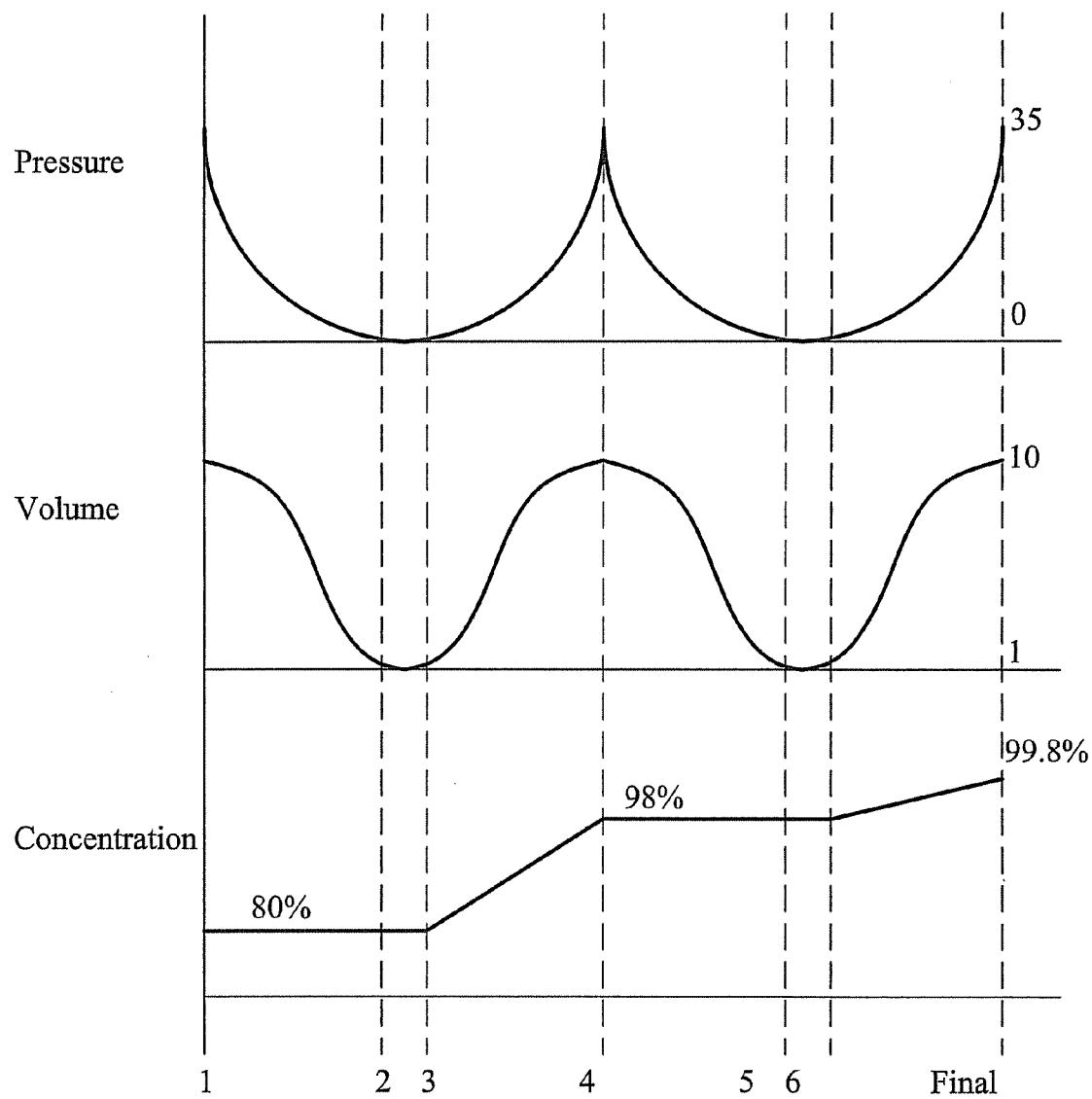
FIG. 4 is an illustrative chart of gas characteristics experienced by a tire during the method of FIG. 3.

As seen in Table 1 and FIG. 4, the method results in the desired concentration at 99.8 percent nitrogen. The final concentration can be further increased by repeating the cycle. The pressure and volume in Table 1 are simplified and made consistent for ease of illustration. Additionally, rather then relying on pressure, volume or concentration, a timed duty cycle can be utilized which would provide similar results. The component periods of the duty cycle can be determined by the average flow rate from the supply hose, volume of tires and desired pressure. Such calculations should be readily apparent to those skilled in the pertinent art.

An embodiment of the present subject matter, upon attachment to all serviced tires and engagement of procedure, vents all tires to atmosphere until a 3 psi manifold and thus internal tire pressure is reached, so as not to "break" the tire bead or damage the tire casing. The tires, as discussed above, are then inflated to a preprogrammed pressure value of nitrogen. The tires are again deflated, vented to atmosphere to approximately 3 psi, and then finally re-inflated to a predetermined pressure value. Upon completion of this procedure, which may be audibly indicated, all of the tires are equally inflated to the common manifold pressure and all tires, because of this "purge" or "washout" process, have a nitrogen purity in excess of a desirable 95% minimum in-the-serviced-tire purity target. As noted previously, without this dilution and washing cycle, because of the volume of air an empty tire contains, even inflation with 100% nitrogen will not yield a purity level above the 95% target.

An important aspect of the present subject matter is the ability to inflate multiple tires at a single time while ensuring equal pressure in the tires. As noted previously a manifold maintains fluid communication between each of the supply hoses and thus each of the multiple tires.

Another aspect of the present subject matter is the ability to replace the air in a tire with nitrogen automatically without the use of a vacuum pump as needed in other prior art devices.

A further aspect of the present subject matter can include independently sensing gas characteristics at each of the tire supply hoses with associated sensors. The data from the sensors may be processed to ensure each tire is equalized with the other tires.

In a further aspect of the present subject matter, the system may be coin-operated for use in retail services, such as at remote air stations located at shopping centers, gas stations, etc.

A further favorable aspect of the present subject matter is that the system provides means of conversion to nitrogen for 1-6 tires simultaneously. (4 tires on the ground and the spare in the trunk or 6 tires on so equipped trucks, or any other combination). This is advantageous with respect to time and facilities, and the vehicle is not required to be lifted.

An additional aspect afforded by the present subject matter is the system does not require the removal of the tire valve core or removal of the tire/wheel from the vehicle. The entire operation requires only 60 seconds of hands-on time, again representing a significant reduction in time, labor and capital costs.

The mobility of the present subject matter may also be favorably increased with the use of an onboard compressed nitrogen tank and onboard battery as opposed to being tethered to a nitrogen generator and electrical power source. The use of an onboard rechargeable battery and nitrogen supply enables the system to be self contained and allows servicing of vehicles at any location.

While preferred embodiments of the present inventive system and method have been described, it is to be understood that the embodiments described are illustrative only and that the scope of the embodiments of the present inventive system and method is to be defined solely by the appended claims when accorded a full range of equivalence, many variations and modifications naturally occurring to those of skill in the art from a perusal hereof.

What I claim is:

1. A method of ensuring pressure equalization between a plurality of tires during conversion of fill gas in the plurality of tires from a first gas mixture to a final gas mixture, wherein the final gas mixture has a higher concentration of nitrogen than the first gas mixture, and wherein the plurality of tires are in fluid communication via a manifold, the method comprising:

extracting a portion of the first gas mixture from the plurality of tires through the manifold;
    supplying nitrogen gas to the plurality of tires from a nitrogen source through the manifold creating a second gas mixture, the second gas mixture comprising the first gas mixture and the supplied nitrogen gas;
    extracting a portion of the second gas mixture from the plurality of tires through the manifold; and
    supplying nitrogen gas to the plurality of tires from the nitrogen source through the manifold creating a third gas mixture, the third gas mixture comprising the first gas mixture, the second gas mixture and the supplied nitrogen gas.

2. The method of claim 1, wherein the final gas mixture is the third gas mixture.

3. The method of claim 1, comprising:

extracting a portion of the third gas mixture from the plurality of tires through the manifold;
    supplying nitrogen gas to the plurality of tires from the nitrogen source through the manifold creating the final gas mixture, the final gas mixture a function of the first gas mixture, the second gas mixture, the third gas mixture and the supplied nitrogen gas.

4. The method of claim 1, wherein the step of extracting a first gas mixture includes reducing the volume of fill gas in the plurality of tires and the step of supplying nitrogen gas to the plurality of tires includes increasing the volume of fill gas in the plurality of tires.

5. A method of ensuring pressure equalization between a plurality of tires during conversion of a fill gas from a first gas mixture to a second gas mixture with a greater nitrogen concentration than the first gas mixture, wherein the conversion includes evacuation of the fill gas and inflation of the tires at least twice, the method comprising:

providing a plurality of supply hoses in fluid communication with each other;
    attaching each of the supply hoses to a corresponding valve stem on the plurality of tires;
    supplying pressurized nitrogen from a gas source to said plurality of tires via the supply hoses;
    monitoring and controlling a gas characteristic of the pressurized nitrogen in the plurality of supply hoses to thereby inflate the plurality of tires to a first predetermined pressure to thereby ensure pressure equalization between each of the plurality of tires;
    releasing the fill gas through the plurality of supply hoses; and,
    monitoring and controlling a gas characteristic of the fill gas in the plurality of supply hoses to thereby deflate the plurality of tires to a second predetermined pressure to thereby ensure pressure equalization between each of the plurality of tires and evacuation of the fill gas.

6. The method of claim 5, further comprising:

inputting into a processor the number and identity of the plurality of tires;
    retrieving tire data associated with the identity of the plurality of tires; and
    determining the first predetermined pressure based on tire data and at least one monitored gas characteristic.

7. The method of claim 5, wherein the gas characteristic is selected from the group consisting of: pressure, temperature, concentration and flow rate.

8. A method of ensuring pressure equalization between a plurality of tires during conversion of fill gas in the plurality of tires from an initial gas mixture to a desired gas mixture, the initial gas mixture having an initial pressure and wherein the desired gas mixture has a higher concentration of nitrogen than the initial gas mixture, comprising:

establishing fluid communication between the plurality of tires via a manifold;
    decreasing pressure in the plurality of tires from the initial pressure by extracting a portion of the initial gas mixture from the plurality of tires through the manifold until a predetermined decreased pressure is reached in the manifold;
    increasing pressure of the plurality of tires from the predetermined decreased pressure by supplying nitrogen gas to the plurality of tires from a nitrogen source through the manifold until a predetermined increased pressure is reached in the manifold to create an intermediate gas mixture, the intermediate gas mixture having a higher concentration of nitrogen than the initial gas mixture;

decreasing pressure in the plurality of tires from the increased pressure by extracting a portion of the intermediate gas mixture from the plurality of tires through the manifold until a second predetermined decreased pressure is reached in the manifold;

increasing pressure of the plurality of tires from the second predetermined decreased pressure by supplying nitrogen gas to the plurality of tires from a nitrogen source through the manifold until a desired pressure is reached in the manifold to create a desired gas mixture; and de-establishing fluid communication between each one of the plurality of tires.

9. The method of claim 8, wherein the decreased pressure and the second decreased pressure are substantially less than the initial pressure and the increased pressure.

10. The method of claim 8, wherein the initial gas mixture consists of air.

\* \* \* \* \*